United States Patent
Poulain et al.

(10) Patent No.: US 12,182,804 B2
(45) Date of Patent: Dec. 31, 2024

(54) KEY-BASED HANDLING OF PRODUCT PURCHASES

(71) Applicant: AMADEUS S.A.S., Biot (FR)

(72) Inventors: Yoann Poulain, Nice (FR); Charles Michel Pierre Guillaume Cultien, Nice (FR); Grégory Valigiani, Cagnes sur Mer (FR); Luigi Di Noia, Antibes (FR); Philippe Sarcey, Vallauris (FR)

(73) Assignee: AMADEUS S.A.S., Biot (FR)

( * ) Notice: Subject to any disclaimer, the term of this patent is extended or adjusted under 35 U.S.C. 154(b) by 403 days.

(21) Appl. No.: 17/510,876

(22) Filed: Oct. 26, 2021

(65) Prior Publication Data

US 2023/0127638 A1   Apr. 27, 2023

(51) Int. Cl.
    *G06Q 20/38*      (2012.01)
    *G06F 16/2455*    (2019.01)
    *G06F 16/28*      (2019.01)
    *G06F 16/13*      (2019.01)
    *G06Q 30/0601*    (2023.01)

(52) U.S. Cl.
    CPC ..... *G06Q 20/3829* (2013.01); *G06F 16/2455* (2019.01); *G06F 16/284* (2019.01); *G06Q 2220/00* (2013.01)

(58) Field of Classification Search
    None
    See application file for complete search history.

(56) References Cited

U.S. PATENT DOCUMENTS

| | | | | |
|---|---|---|---|---|
| 8,190,597 B1 * | 5/2012 | Millett | ..................... | G06F 16/81 707/716 |
| 10,182,128 B1 | 1/2019 | Allocca et al. | | |
| 11,080,294 B1 * | 8/2021 | Johnston | ............... | G06F 40/205 |
| 2008/0167909 A1 * | 7/2008 | de Marcken | ........... | G06Q 50/14 705/5 |
| 2020/0057781 A1 | 2/2020 | McCormick | | |
| 2021/0109912 A1 * | 4/2021 | Biswas | ................. | G06F 21/602 |
| 2023/0169068 A1 * | 6/2023 | Yagoub | ................. | G06F 16/221 707/609 |

OTHER PUBLICATIONS

Khoshgoftar, Sina, "Learn 7 database in 7 week (introduction)", Apr. 8, 2021, Linkedin, Retrieved from the Internet on Feb. 6, 2023 from URL: https://www.linkedin.com/pulse/learn-7-database-weekintroduction-sina-khoshgoftar/.

Anonymous, "Document-Oriented Database." Wikipedia, Wikimedia Foundation, Aug. 23, 2021, Retrieved from the Internet on Feb. 8, 2023 from URL: https://en.wikipedia.org/w/index.php?title=Document-oriented_database&oldid=1040309898.

* cited by examiner

*Primary Examiner* — Kamal M Hossain (74) *Attorney, Agent, or Firm* — PERRY + CURRIER INC.

(57) ABSTRACT

A database system, method, and computer program product of handling purchases of products is presented, in which the database system comprises a relational database storing relational data for a plurality of products, a key-value database storing a plurality of first files and a plurality of second files, an interface module connecting the relational database with the key-value database, and a shopping engine to communicate with the key-value database. The interface module converts relational data stored in the relational database into first files and second files. The shopping engine queries the key-value database to retrieve available products in response to an availability request.

30 Claims, 6 Drawing Sheets

KEY-BASED HANDLING OF PRODUCT PURCHASES

FIELD OF THE INVENTION

The present invention generally relates to computerized systems and methods for product purchases using large database systems. In particular, it concerns a key-based data retrieval of converted product information during product purchases.

BACKGROUND OF THE INVENTION

Computerized implementation and support of product purchases become more and more complex and resource demanding as products can be purchased all over the world. Most of the product information is stored in relational database systems that are queried to receive information about products fulfilling requests and to enable a purchase of the products.

For example, hotel property managers enter hotel rates in their property management system via an interface connected to one or more relational databases. When a traveler then makes a shopping request, a shopping engine accesses the one or more relational databases to obtain the applicable rates. However, relational data models are usually not scalable. Relational databases can therefore only handle a limited number of transactions per second. Such architectures are thus not suitable for a hotel chain with 6000 hotels and a high number of concurrent shopping requests as the supported number of transactions per second is usually in the order of 20, whereas 5000 transactions per second are to be handled in practice.

Computerized implementation of product shopping of many other product categories also faces similar constraints since product management systems traditionally rely on relational databases for reasons of atomicity, concurrency, and isolation.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose to present some concepts of the subject matter in a simplified form as a prelude to the more detailed description that is presented later.

According to a first aspect, a database system of handling purchases of products is provided. The database system comprises a relational database storing relational data for a plurality of products and a key-value database storing a plurality of first files and a plurality of second files, wherein the first and second files represent the relational data, wherein the first files are accessible by using respective first keys associated with the products and comprise respective at least one second keys, wherein the second files are accessible by using the respective at least one second keys. The database system further comprises an interface module connecting the relational database with the key-value database and a shopping engine to communicate with the key-value database.

The interface module is configured to convert, per product, at least a part of the relational data stored in the relational database into one of the first files and at least one of the second files and to store the one first file and the at least one second file in the key-value database. Additionally, the shopping engine is configured to receive an availability request for a product from a client device, to query the key-value database by using a first key associated with the product to retrieve a first file associated with the product, to process said first file to extract at least one second key and metadata associated with said at least one second key to compare, per second key, the metadata with the availability request to determine second keys for which the metadata fulfills the availability request, to query the key-value database by using a list of said second keys fulfilling the availability request to receive corresponding second files, to extract data from said second files, and to send the data extracted from said second files to the client device.

According to a second aspect, a method of handling purchases of products in a database system is provided. The method comprises converting, per product, at least a part of the relational data stored in the relational database into one of the first files and at least one of the second files and storing the one first file and the at least one second file in the key-value database. The method further comprises receiving an availability request for a product from a client device, querying the key-value database by using a first key associated with the product to retrieve a first file associated with the product, processing said first file to extract at least one second key and metadata associated with said at least one second key, comparing, per second key, the metadata with the availability request to determine second keys for which the metadata fulfills the availability request, querying the key-value database by using a list of said second keys fulfilling the availability request to receive corresponding second files, extracting data from said second files, and sending the data extracted from said second files to the client device.

According to a third aspect, a computer program product which is either in the form of a machine-readable medium with program code stored on it, or in the form of a propagated signal comprising a representation of program code, is provided. The program code is arranged to carry out a method, when executed on a computer system, wherein the method comprises converting, per product, at least a part of the relational data stored in the relational database into one of the first files and at least one of the second files and storing the one first file and the at least one second file in the key-value database. The method further comprises receiving an availability request for a product from a client device, querying the key-value database by using a first key associated with the product to retrieve a first file associated with the product, processing said first file to extract at least one second key and metadata associated with said at least one second key, comparing, per second key, the metadata with the availability request to determine second keys for which the metadata fulfills the availability request, querying the key-value database by using a list of said second keys fulfilling the availability request to receive corresponding second files, extracting data from said second files, and sending the data extracted from said second files to the client device.

These and other objects, embodiments and advantages will become readily apparent to those skilled in the art from the following detailed description of the embodiments having reference to the attached figures, the invention not being limited to any particular embodiments.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

Therefore, embodiments are described with reference to the following figures.

DESCRIPTION OF PREFERRED EMBODIMENTS

Figure 1:
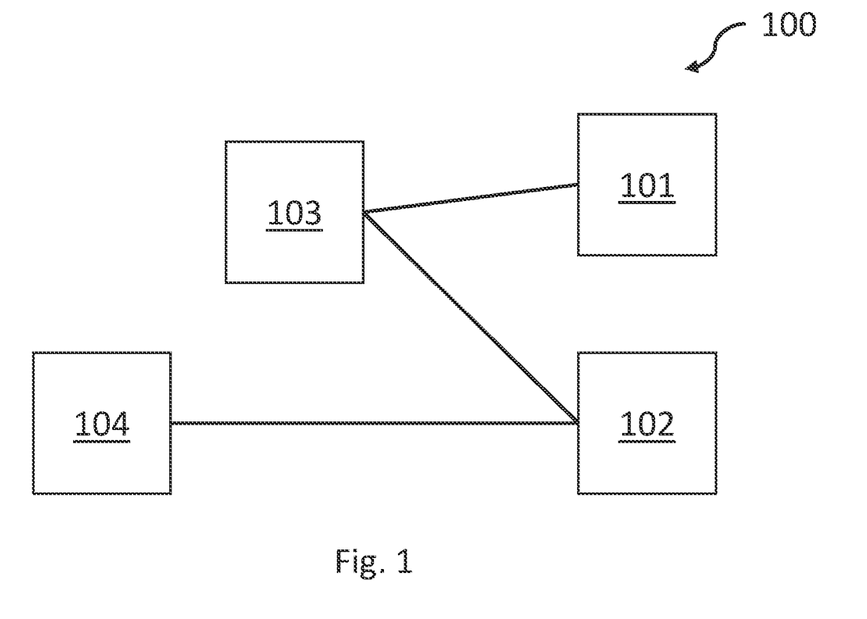
FIG. 1 shows a database system of handling purchases of products according to the invention.

FIG. 1 shows a database system 100 of handling purchases of products according to the invention. The database system 100 comprises a relational database 101 and a key-value database 102, an interface module 103, and a shopping engine 104.

The relational database 101 stores relational data for a plurality of products. The products may be all of the same type, travel-related products, food-related products, entertainment related products and the like. The relational database 101 may also store different types of products. The products of one type may also be of a same sub-type, for example, the relational database 101 may store travel-related products and, in particular, hotel booking products. The relational data also comprises information of the products, i.e., detailed description, price, availability, shipping costs, additional bookable services, manufacturer, airline/provider of a service and many more or much less depending on the product to purchase. The relational database 101 may be an Oracle®, MySQLT™, Microsoft® SQL Server, IBM® Db2®, SQLite, MariaDB, Apache Hive™, or any other relational database.

The key-value database 102 stores a plurality of first files and a plurality of second files, wherein the first and second files represent the relational data stored in the relational database 101. The relational data of products stored in the relational database 101 is converted to corresponding first and second files that are stored in the key-value database 102. The key-value database 102 may be a Couchbase, LevelDB, Redis, Riak, or any other key-value database. The relational database 101 as well as the key-value database may be locally stored databases or distributed database system that may also comprise a plurality of separately stored databases.

The interface module 103 is a converting module that connects the relational database 101 and the key-value database 102 and converts the data from the relational database 101 to be stored as files in the key-value database 102. For example, the relational database 101 holds data associated with hotel bookings. The interface module 103 may be configured to convert the relational data to a first file and at least one second file periodically at pre-determined time intervals, e.g., every hour, every day, or any other applicable time intervals.

The shopping engine 104 is a module that is configured to execute shopping processes by communicating with the key-value database 102. The shopping engine 104 and the interface module may be stored on the same server, on separate servers, in the cloud, or at any other suitable systems or locations. The relational database 101, the key-value database 102, the interface module 103, and the shopping engine 104 may be connected via a network. The network may be a wide area network, global network, the Internet, or similar network, may be a public or a private network, and may include multiple interconnected networks as is known in the art.

Figure 2:
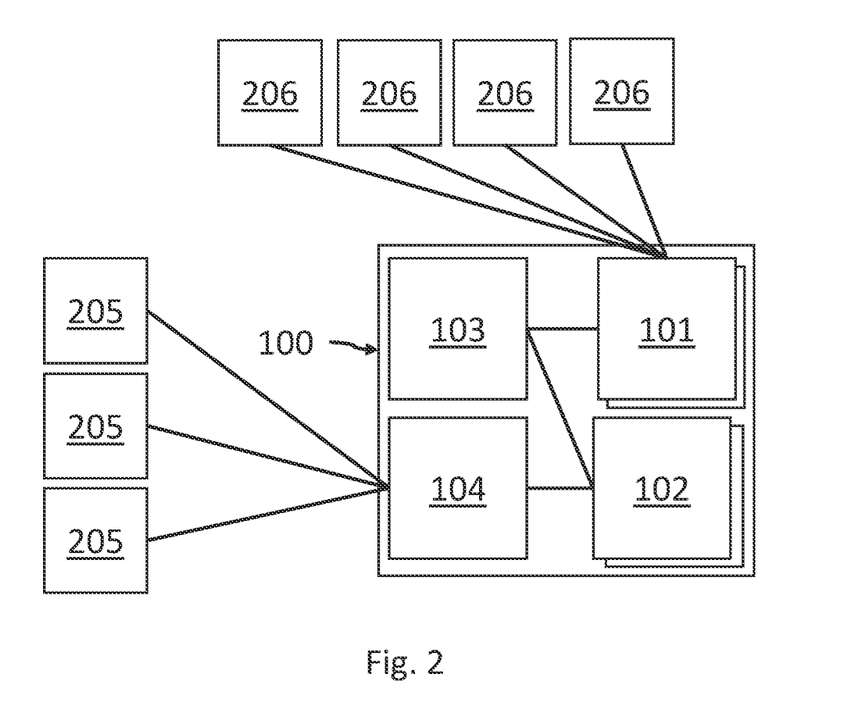
FIG. 2 shows an expanded view of the database system of handling purchases of products.

FIG. 2 shows an expanded view of the database system 100 of handling purchases of products, in which also a plurality of client devices 205 and a plurality of provider devices 206 are connected to the database system 100.

A client device 205 may connect to the shopping engine to search for and/or purchase a product. For example, the client device 205 includes at least one of a computer, a server, a mobile station, a laptop, a smartphone, an application, a further database system. The client device 205 may send a request to the shopping engine to purchase a product. Such a request may generally be referred to as availability request as available products are requested. However, depending on the specific implementation of the shopping engine 104, also products that are currently not available may be returned to the client device 205 for information purposes. For example, the client device 205 may also retrieve information of all existing hotel room types in response to an available request even if some of the room types are not available at a specific time requested.

A provider device 206 may further connect to the relational database 101 to store data relating to the products to be offered to client devices. The provider devices 206 may each be associated to providers of one or more products that can be purchased by the client devices 205. For example, a provider may be a carrier, a leisure/event provider or a travel provider, e.g., an airline, a hotel or hotel chain, a taxi company, a rental car agency, a train company, an event agency, a ticket platform, or a meta-agency handling and providing a plurality of different services. Additionally or alternatively, the provider may also be a mobile phone operator, a network operator, a warehouse, a shopping chain, and the like.

The client devices 205 and the provider devices 206 may connect to the database system 100 via a network, which may be a wide area network, global network, the Internet, or similar network, may be a public or a private network, and may include multiple interconnected networks as is known in the art. The provider devices 206 may thereby connect directly to the relational database 101 or via an interface or other additional module (not shown).

The provider may store data of products to be offered to clients in the relational database 101 in a tree-like structure, e.g. according to a given relational database scheme. For example, if the products are apartments or hotel rooms, there may be a table in the relational database 101 comprising all properties, i.e., comprising entries for all hotels offering rooms. The table may have columns for different characteristics of the hotels, such as a city code, a country code, a name, a chain and/or the like. Another table may hold information on room types with information, e.g., on facilities and view type etc., another table may hold information on rate plans, another on rules for not showing up or for cancelling and the like. There is consequently a plurality of tables that define in a tree-like structure a final product, in an example, this final product of a hotel room. On the example of a hotel room, the relational database 101 may store at least the database tables shown in Table 1.

TABLE 1

| Name of Table | Columns |
|---|---|
| RatePlan | Code, Chain, Brand, Property, Description, SelllingPeriod, PriceGridCode, FollowHousePolicy |
| PriceGrid | Code, Chain, Brand, Property, PriceGridRef, MinLOS, MaxLOS, Currency, AmountRuleId |
| AmountRule | Chain, Brand, Property, Code, DatePeriod, Product, Occupancy, Amount |
| PolicyNoShow | Code, Chain, Brand, Property, DatePeriod, Deadline, Fee |
| PolicyCancellation | Code, Chain, Brand, Property, RatePlanCode, DatePeriod, Deadline, Fee |
| PolicyDeposit | Code, Chain, Brand, Property, RatePlanCode, DatePeriod, Deadline, Fee |
| HousePolicyNoShow | Code, Chain, Brand, Property, RatePlanCode, DatePeriod, Deadline, Fee |
| HousePolicyCancellation | Code, Chain, Brand, Property, RatePlanCode, DatePeriod, Deadline, Fee |
| HousePolicyDeposit | Code, Chain, Brand, Property, RatePlanCode, DatePeriod, Deadline, Fee |
| TaxRule | Id, Period |
| Tax | Code, TaxRuleId, Amount, Type, CodeReference |
| NoArrivalRule | Product, DatePeriod |
| NoStayRule | Product, DatePeriod |
| HurdlePoint | Chain, Brand, Property, Product, Amount |

The rate plan is the main element for calculating the final product as it identifies the price, i.e., the fare of the hotel room. The fare of a hotel room and the list of the characteristics of the hotel room compose the offer that is sold to a customer. Therefore, the table RatePlan contains the list of all rate plans for a given property. The table PriceGrid contains parameters for prices and references to amount rules. The table AmountRule defines the rule to compute prices, this table comprises, among others, an amount (flat amount or a relative amount like a percentage) and a date period in which this amount is applicable. A plurality of amount rules let you cover different periods and different products. Price grids may be combined to create different prices. For example, consider a first price grid PG1 to contain a flat amount, e.g., 500 USD, and another price grid PG2 to contain a relative amount, e.g., −10%. If price grid PG1 is linked to PG2, the resulting price is 450 USD.

The policy tables contain selling conditions. House policies are selling conditions defined for a specific hotel and for a given period of time. The other policy tables specify selling condition for a given rate plan. Taxes are defined using the two tables TaxRule and Tax. These two tables may reference other taxes to create a complex taxation schema. A rate plan may have zero or one of more restrictions: the table NoArrivaiRule defines a restriction forbidding the use of this fare if the check-in date is before a specific date, the table NoStayRule defines a restriction forbidding this fare when the check-in is inside a specified period. The table HurdlePoint table further specifies if a rate plan has to be set as not available if the computed price is less than a specific amount.

Figure 3:
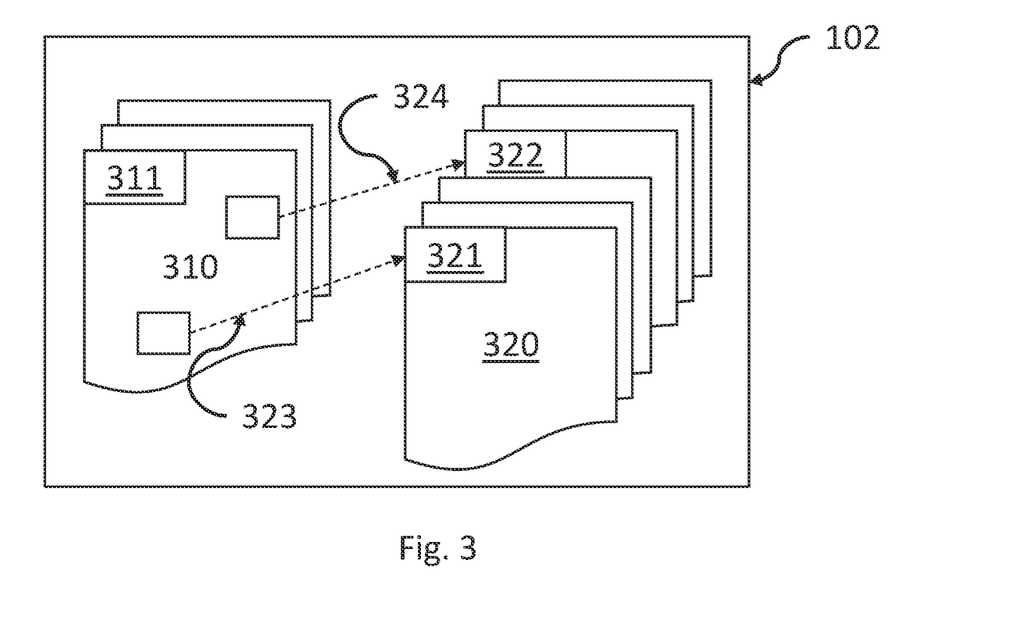
FIG. 3 depicts the key-value database with first and second files.

FIG. 3 depicts the key-value database 102 with a plurality of first files 310 and a plurality of second files 320. The first files 310 are accessible by using a respective first key 311, which define respective unique identifiers to obtain data from the first file 310. The second files 320 are accessible by using a respective second key 321, 322, which define respective identifiers unique to the respective second file 320. Hence, each first file 310 or second file 320 is associated with a specific unique key 311, 321, 322, which is required to access the respective first file 310 or second file 320. The first key 311 is associated with a specific product, e.g., each product, which is stored in the relational database 101, has its unique key in the key-value database 102, which enables to access the first file 310 associated with the product.

Any one of the first files 310 comprises at least one second key 321, 322 in its value part. The at least one second key 321, 322 comprised by the first files 310 can be used to access the second files 320. In the example of FIG. 3, the second key 321, which is stored in the first file 310, is identical to the second key 321 (shown by dotted line 323) and the second key 322, which is stored in the first file 310, is identical to the second key 322 (shown by dotted line 324). Hence, on the basis of the second keys 321, 322 that are stored in the first file 310, an efficient retrieval of data associated with the product stored in the first file 310 can be achieved.

The approach of having a first file 310 and at least one second file 320 with the first file 310 comprising second keys 321, 322 to access the at least one second file 320 is based on a technical optimum between time of data retrieval and time of data processing. For example, if all data relating to a specific product or product series, such as every required information about all rooms of a hotel, would be comprised by the first file 310, the time of data retrieval would be short as only one single file. i.e., the first file 310 has to be accessed. However, the time of extracting and processing the relevant data from the first file 310, which would further have a significant size, would be much beyond acceptable response times. Hence, via dividing the data in a first file 310 and a plurality of second files 320 and—when answering a request—selecting the relevant second keys 321, 322 from the first file 310 and only retrieving the relevant data from the respective second files 320, an optimum of data retrieval and data processing times can be reached.

On the example of hotel rooms, the first file 310 may comprise basic information about a hotel comprising a plurality of hotel rooms. For example, the first file 310 may comprise property level data that is comprised of two different parts of information. The first part may be a rate plan information part, the second part may be parity group information part.

The rate plan information part may store a list of all rate plans distributed in the property and a list of all possible room types for each rate plan. The rate plan information part may also comprise data duplicated from second files 320 to be able to filter results and/or to accelerate access. For example, the first file 310 may comprise meta information specific to the listed rate plans that define when the rate plans are applicable, e.g., end or begin of sell date and/or of stay date, in order to be able to reject rate plans that are not applicable for the final candidates. The parity group information part may store dependencies of rate plans. For example, the parity group information describes groups of rates that are dependent of others. e.g., that rates B, C, and D are dependent on rate A so that if rate A is not available, rates B, C, and D are also not available.

Similar to property level data, the second files 320 comprise rate plan data. Rate plans have conditional rules applicable to them, typically based on the calendar period considered for a transaction. These rules are then stored in the second files 320. Moreover, the second files 320 may also store policies that describe minimum requirements or conditions a customer has to fulfill to be allowed to book an offer or penalties & fees if the customer does not fulfill these rules. Moreover, the second files 320 may also comprise price grid data that comprises data about the price grid, e.g., code of the price grid, type of the price grid etc., and amount rule data, which defines the actual price of the product.

This specific distribution and reorganization of hotel room information into a two-level file structure with first files 310 and second files 320 stored in the key-value database 102 significantly shortens the response times to shopping requests. For example, if all the data needed for shopping/search requests is retrieved from the relational database 101, we expect the response times to be around 500 ms or even higher. For the same shopping/search requests but when using the two-level file structure in the key-value database 102 as described above, the response times will likely be less than 50 ms and may never exceed 80 ms. The more data is stored in the relational database 101, the greater the saving in response time is when applying the described two-level file structure in the key-value database 102.

Figure 4:
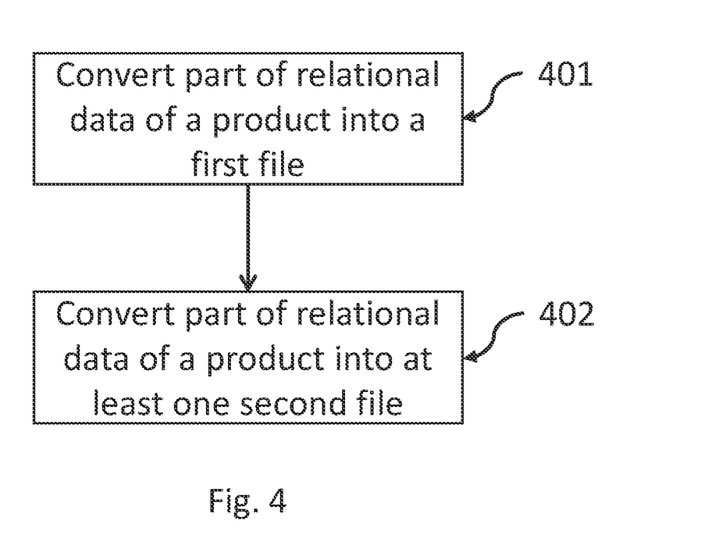
FIG. 4 is a flowchart of converting relational data to first and second files.

As will be apparent to the skilled person from the description above, the data stored in the relational database 101 and the key-value database 102 correspond to each other. Hence, and as shown in FIG. 4, a data conversion is required between the relational data and the key-value data.

The interface module 103 therefore performs a two-stage conversion process. The interface module 103 may convert the relational data to the first files 310 and the second files 320 periodically at pre-determined time intervals. Alternatively, the relational data may be converted in response to changes of the data in the relational database 101.

As shown in box 401, part of the relational data of a product is converted and stored into a first file, such as the first file 310. In the example of hotel rooms, in which the first file 310 stores property data, data related to a property is extracted from the relational database 101, in particular, at least from table RatePlan but in some embodiments also from other tables. As shown in box 402, part of the relational data of the product is further converted and stored into a second file, such as the second file 320. In some embodiments, at least part of the data stored in the second file 320 is duplicated in the first file 310. In the hotel example, the first file 310 and the second file 320 both may comprise information extracted from the table AmountRule.

The first files 310 and the second files 320 may be stored in the same data format. In an alternative embodiment, the data formats of the first files 310 and the second files 320 may be different. The data format of the first file 310 and/or the second file 320 may be JSON (JavaScript Object Notation), HTML (Hypertext Markup Language) or any other suitable data format.

Conversion from the data of the relational database 101 to the files stored in the key-value database 102 may therefore comprise a flattening process, in which data comprised by the relational database 101 is stored in the first and the second files 310, 320. The flattening process may also comprise further computations. In the hotel room example, besides storing all the information about a price grid, e.g., general price grid information and amount rules per calendar period in a second file 320, the second file 320 may also comprise final amounts of the products by retrieving and resolving the tree of dependencies. The conversion process as depicted in FIG. 4 therefore results in a layered functional structure so that each second file's core information is stored in an upper layer. This enables an efficient filtering of the data resulting in an efficient retrieval of the data when retrieving and extracting data for product purchases as only those second files 320 are accessed that fulfill the availability request.

Figure 5:
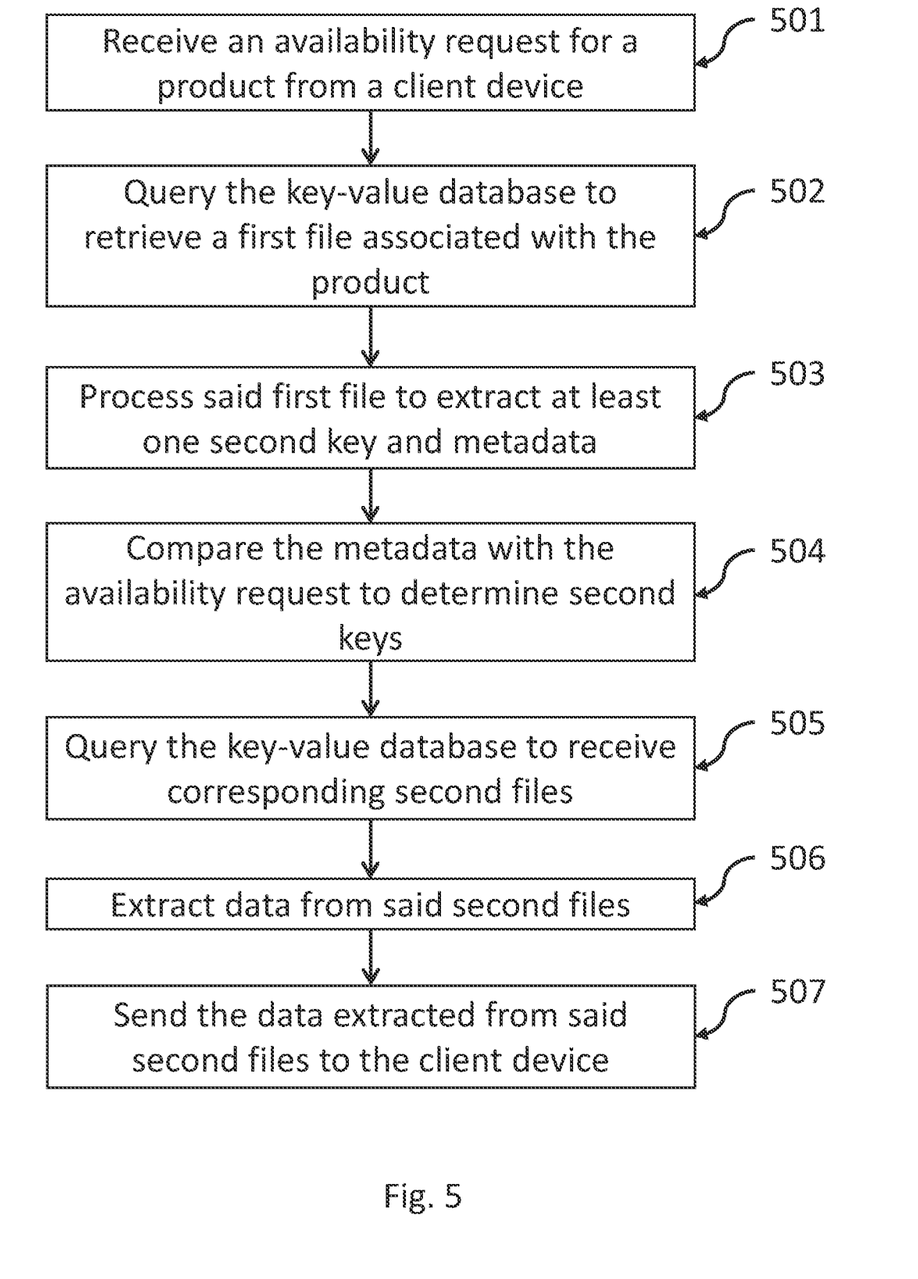
FIG. 5 is a flowchart of retrieving and extracting data for product purchases.

Retrieving and extracting data for product purchases comprises the activities shown in the flowchart of FIG. 5. The shopping engine 104 receives an availability request for a product from a client device 205 in box 501. The availability request may comprise information of the product the client wants to purchase. For example, the availability request may comprise a date of arrival and date of departure and a city/location if the client searches for a hotel room.

Next, depicted in box 502, the key-value database 102 is queried (e.g., by the interface module 103) by using a first key 311 associated with the product to retrieve a first file 310 associated with the product. In an embodiment, the first key 311 may be comprised by the availability query, i.e., entered by the client or may be retrieved by the shopping engine 104 through a pre-processing query to a database, which may be the relational database 101 or any other remote or local storage. The pre-processing query may for example request all first keys 311 fulfilling the availability request. In the hotel room example, the shopping engine 104 may retrieve all unique identification numbers, i.e., the first keys 311 in this example, of properties fulfilling the availability request in terms of location. e.g., all hotels being located in the city comprised by the availability request. In another example, if the availability request is a dedicated request, i.e., a request for availability of rooms of a specified property, the first key 311 may be retrieved by a mapping of the property name to the unique identification number.

By using the first key 311, the respective first file 310 can be accessed. The first file 310 is then processed to extract at least one second key 321, 322 as well as metadata. This is shown in box 503. Metadata is data that enables e.g., the interface module 103 to determine, which second files 320 fulfill, or in other words, apply to the availability request. In the hotel room example, metadata corresponds to the meta information mentioned above. Hence, the metadata comprises information of whether a rate plan is applicable or not to the availability request. Therefore, the metadata is compared per second key 321, 322 with the availability request to determine those second keys 321, 322 for which the metadata fulfills the availability request (depicted in box 504).

For those determined second keys 321, 322, the key-value database 102 is queried, shown in box 505. This can be done by using a list of said second keys 321, 322 that fulfill the availability request and results in receiving the corresponding at least one second file 320. In box 506, data from said at least one second file 320 is extracted to build the final product(s). In the hotel room example, the respective conditions and prices that are stored in the second files 320 for each rate plan are retrieved and combined with the information of the first file 310 to build at least one final hotel room product that is available to be booked by the requesting client. The data extracted that correspond to the final products to be offered is then sent to the requesting client device, which is shown by the final box 507.

The present methodologies facilitate a real-time data retrieval. The presented system enables high availability services with low response times. Conventional systems employing relational databases require a vast number of joint queries to the database to retrieve available products. With the presented system, the data retrieval only requires a retrieval of one first file 310 relating to the requested property and N second files 320 depending on the number of rate plans fulfilling the request. Hence, the response time can be reduced to under 80 ms.

Figure 6:
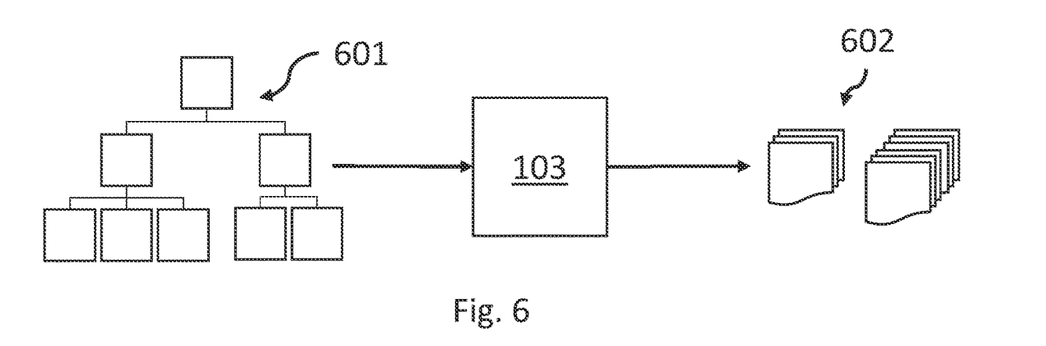
FIG. 6 shows and example of flattening data for converting relational data to first and second files.

FIG. 6 shows an example of flattening data for converting relational data to first and second files 310, 320. On the left-hand side 601, a tree-like structed of relational data stored in the relational database 101 is depicted. For example and explained on the hotel room embodiment, there may exist one property that provides two rate plans. One rate plan has three dependent rate plans that are only applicable under certain conditions. The other rate plan has two further rules that may be fulfilled if a booking is conducted. The tree-like structure is then converted by the interface module 103 to a plurality of first and second files 310, 320 on the right side 602.

Figure 7A:
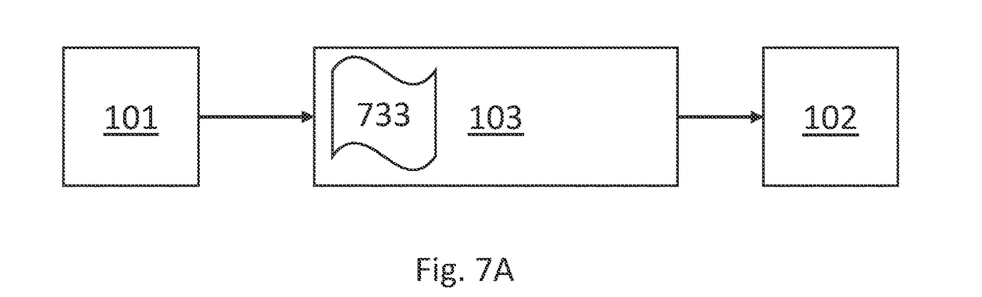
FIGS. 7A and 7B show examples of serializing data for converting relational data to first and second files.
Figure 7B:
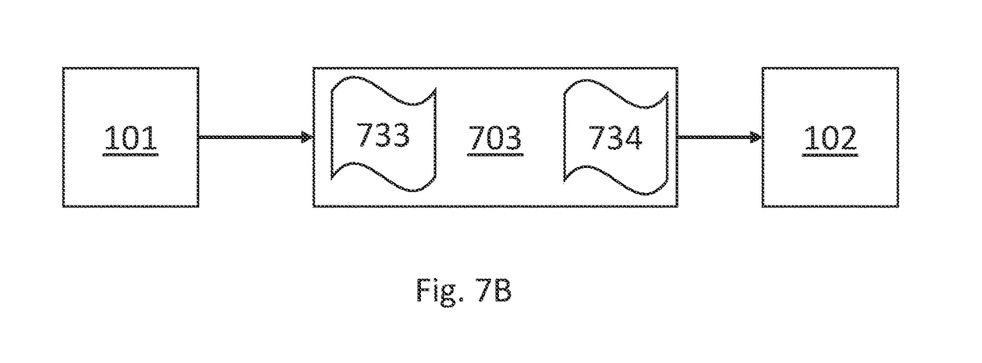

FIGS. 7A and 7B show examples of serializing data for converting relational data to first and second files 310, 320. In FIG. 7A, the relational data from the relational database 101 is converted via the interface module 103 to data files stored in the key-value database 102. In this embodiment, the interface module 103 applies a serialization protocol 733 on the relational data to store serialized data in the first files 310 and the second files 320. With using the serialization protocol, the data structure of the relational database 101 is transformed to a data structure that can be stored more efficiently (with less memory required) and constitutes a semantically identical clone of the original data. The serialization protocol may be for example Google Protobuf serialization protocol, Hessian 2.0 serialization protocol, Redis serialization protocol, or any other suitable protocol. Serialization may be generally achieved by using a protocol buffer or a flat buffer.

In FIG. 7B, the interface module 103 further applies a compression protocol 734 on the serialized data. Applying a compression protocol on the serialized data enables an efficient storage of the first and second files 310, 320. The compression protocol may be for example IP (Internet Protocol) Payload compression protocol, Snappy compression protocol or any other suitable protocol.

Figure 8:
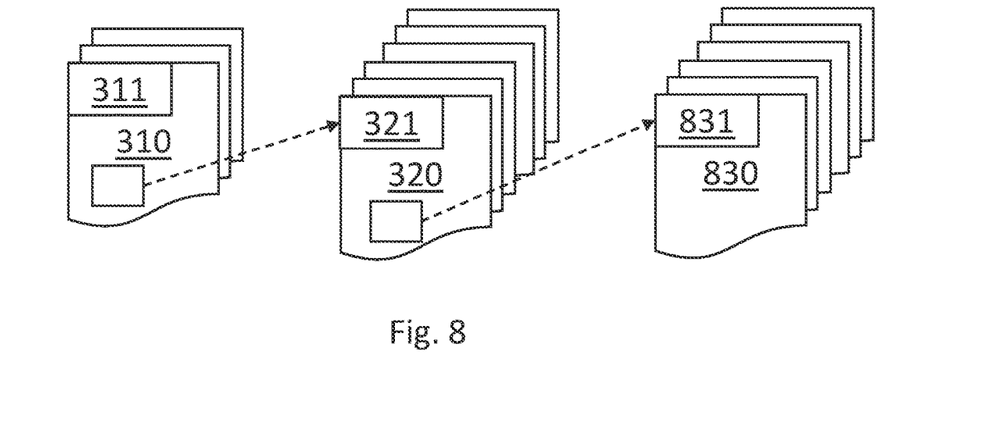
FIG. 8 shows an example of data retrieval with first, second and third files.

FIG. 8 shows an embodiment with three layers of files stored in the key-value database 102. Therefore, the first files 310 comprise at least one second key 321 of at least one second file 320. The second files 320 then comprise at least one third key 831 of at least one third file 830. Of course, four or more layers of files are also possible if required.

Figure 9:
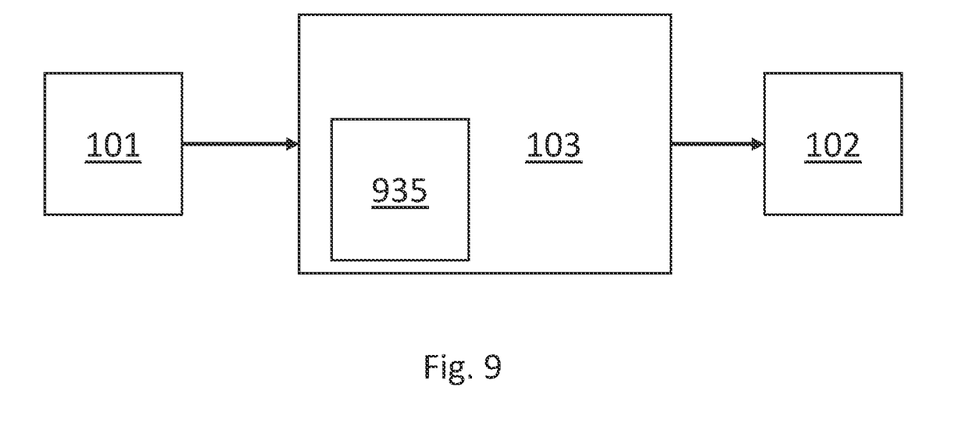
FIG. 9 depicts an embodiment with a period merger module for purchases of travel related products.

FIG. 9 depicts a further embodiment for purchases of travel related products. Prices of travel-related products usually depend upon time intervals, in which they apply. Hence, the interface module 103 further comprises a period merger module 935. When converting the relational data stored in the relational database 101, the period merger module 935 comprised by the interface module 103, identifies such time intervals of price structures and creates entries in the first and/or second files 310, 320 of the key-value database 102 reflecting the price structures and the time intervals.

Figure 10:
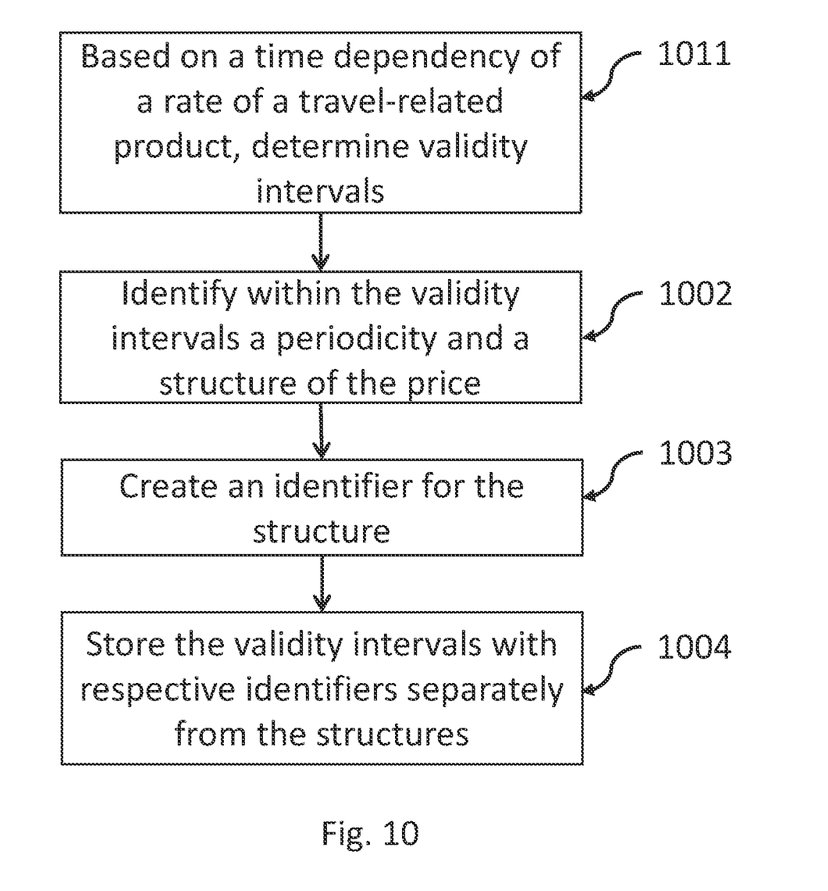
FIG. 10 is a flowchart of extracting validity intervals for converting relational data to first and second files.

The workflow of the period merger module 935 is depicted in the flowchart of FIG. 10. The period merger module 935 determines, based on a time dependency of a rate of a travel-related product, validity intervals of at least one price of the travel-related product, i.e., the time intervals a price applies. This is shown in box 1001. For example, the period merger module 935 analyzes the data stored in the relational database 101. For all price grids, it is analyzed whether the price is time dependent. If so, a validity interval is determined.

Thereafter, the period merger module 935 identifies—within the validity intervals—a periodicity and a structure of the at least one price if present (box 1002). For example, if a price applies only on weekends, the periodicity would be weekly and the validity interval two days. Moreover, the structure of the price may be an amount but also conditions that apply to the price, such as only for children or elderly, only in combination with late arrival, or the like.

In box 1003, the period merger module 935 creates an identifier for the structure, i.e., a unique identifier for the specific price structure. This identifier is then stored with the respective validity interval, e.g., in the first file 310. The second file 320 may then store the specific structure of the price. This is depicted in box 1004. By storing the validity interval separately from the specific structure, a plurality of validity intervals can be defined for one structure.

In another embodiment, a computer program product comprising instructions is provided. These instructions, when the program is executed by a computer, cause the computer to carry out the methods as described herein. The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Figure 11:
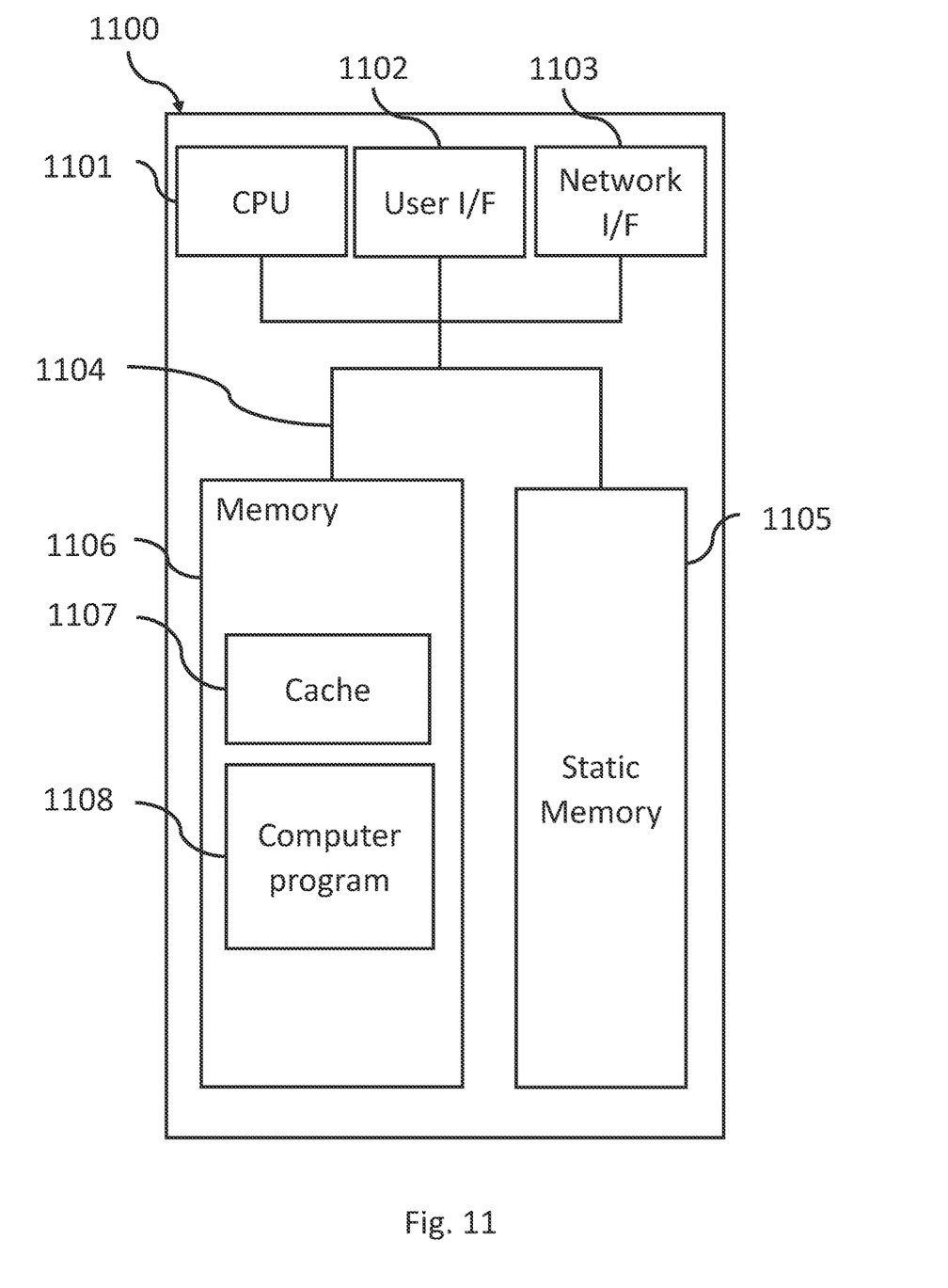
FIG. 11 is a diagrammatic representation of an exemplary computing machine implementing the method described herein.

FIG. 11 is a diagrammatic representation of an exemplary computing machine 1100 implementing at least part of the method described herein. Similar computing machines may also realize one or more of the modules/interfaces 103, 104, the client and/or provider devices 205, 206, as well as the databases 101, 102 described above. The computing machine 1100 includes a set of instructions to cause the computing machine 1100 to perform any of the methodologies discussed herein when executed by the computing machine 1100.

The computing machine 1100 includes at least one processor 1101, a main memory 1106 and a network interface device 1103 which communicate with each other via a bus 1104. Optionally, the computing machine 1100 may further include a static memory 1105 and a disk-drive unit. A video display, an alpha-numeric input device and a cursor control device may be provided as examples of user interface 1102. The network interface device 1103 connects the computing machine 1100 to any of the other components described above.

Computing machine 1100 includes a memory 1106 such as main memory, random access memory (RAM) and/or any further volatile memory. The memory 1106 may store temporary data and program data to facilitate the functionality database system 100. The memory 106 may also comprise one or more caches 1107 storing data recently retrieved from the databases 101, 102. The caches may be level 1 (L1), level 2 (L2), and/or level 3 (L3) caches. The memory 1106 may also store computer program data 1108 to implement the methods as described above.

A set of computer-executable instructions (computer program code 1108) embodying any one, or all, of the methodologies described herein, resides completely, or at least partially, in or on a machine-readable storage medium, e.g., the memory 1106. The instructions 1108 may further be transmitted or received as a propagated signal via the Internet through the network interface device 1103 or via the user interface 1102. Communication within computing machine is performed via a bus 1104. Basic operation of the computing machine 1100 is controlled by an operating system which is also located in the memory 1106, the at least one processor 1101 and/or the static memory 1105.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect.

Accordingly, the described embodiments should be understood as being provided by way of example, for the purpose of teaching the general features and principles of the invention, but should not be understood as limiting the scope of the invention, which is as defined in the appended claims.

The invention claimed is:

1. A database system for handling purchases of products, the database system comprising:
   a relational database storing relational data for a plurality of products;
   a key-value database storing a plurality of first files and a plurality of second files, wherein the first and second files represent the relational data, wherein the first files are accessible by using respective first keys associated with the products and comprise respective at least one second keys, wherein the second files are accessible by using the respective at least one second keys;
   an interface module connecting the relational database with the key-value database;
   a shopping engine to communicate with the key-value database;
   wherein the interface module is configured to:
      convert, per product, at least a part of the relational data stored in the relational database into (i) one of the first files containing a plurality of the second keys and (ii) a plurality of the second files corresponding to the second keys contained in the first file; and
      store the one first file and the plurality of the second files in the key-value database;
   wherein the shopping engine is configured to:
      receive an availability request for a product from a client device;
      query the key-value database by using a first key associated with the product to retrieve a first file associated with the product;
      process said first file to extract the plurality of second keys and metadata associated with the plurality of second keys;
      compare, per second key among the plurality of second keys contained in the first file, the metadata with the availability request to determine a subset of the plurality of second keys contained in the first file for which the metadata fulfills the availability request;
      query the key-value database by using a list of the subset of the second keys fulfilling the availability request to receive corresponding second files;
      extract data from said second files; and
      send the data extracted from said second files to the client device.

2. The database system according to claim 1, wherein the interface module is further configured to flatten a tree-like structure of the relational database while converting the relational data into the first file and the plurality of second files.

3. The database system according to claim 1, wherein the interface module is further configured to apply a serialization protocol on the relational data to store serialized data in the first files and the second files while converting the relational data into the first file and the plurality of second files.

4. The database system according to claim 3, wherein the interface module is further configured to apply a compression protocol on the serialized data while converting the relational data into the first file and the second files.

5. The database system according to claim 1, wherein the shopping engine and/or the interface module are configured to store a mapping of the relational data to the corresponding first file and the plurality of second files.

6. The database system according to claim 1, wherein the interface module is configured to convert the relational data to the first file and the plurality of second files periodically at pre-determined time intervals.

7. The database system according to claim 1, wherein the interface module is configured to convert the relational data to the first file and the plurality of second files in response to changes of the relational data.

8. The database system according to claim 1, wherein the first files and/or the second files comprise at least one third key, wherein the key-value database further stores third files, wherein the interface module is further configured to convert a part of the relational data to at least one third file, wherein the third files are accessible by using the at least one third key.

9. The database system according to claim 1, wherein the purchases of products are bookings of travel-related products.

10. The database system according to claim 9, wherein the interface module comprises a period merger module, wherein the period merger module is configured to:
- based on a time dependency of a rate of a travel-related product, determine validity intervals of at least one price of the travel-related product;
- identify within the validity intervals a periodicity and a structure of the at least one price;
- create an identifier for the structure; and
- store the validity intervals with respective identifiers separately from the structure.

11. A method of handling purchases of products in a database system, wherein the database system comprises:
- a relational database storing relational data for a plurality of products;
- a key-value database storing a plurality of first files and a plurality of second files, wherein the first and second files represent the relational data, wherein the first files are accessible by using respective first keys associated with the products and comprise respective at least one second keys, wherein the second files are accessible by using the respective at least one second keys;
- an interface module connecting the relational database with the key-value database;
- a shopping engine to communicate with the key-value database;

wherein the method comprises:
- converting, per product, at least a part of the relational data stored in the relational database into (i) one of the first files containing a plurality of the second keys and (ii) a plurality of the second files corresponding to the second keys contained in the first file;
- storing the one first file and the plurality of the second files in the key-value database;
- receiving an availability request for a product from a client device;
- querying the key-value database by using a first key associated with the product to retrieve a first file associated with the product;
- processing said first file to extract the plurality of the second keys and metadata associated with the plurality of second keys;
- comparing, per second key, among the plurality of second keys contained in the first file, the metadata with the availability request to determine a subset of the plurality of second keys contained in the first file for which the metadata fulfills the availability request;
- querying the key-value database by using a list of the subset of the said second keys fulfilling the availability request to receive corresponding second files;
- extracting data from said second files; and
- sending the data extracted from said second files to the client device.

12. The method according to claim 11, wherein the method further comprises flattening a tree-like structure of the relational database while converting the relational data into the first file and the plurality of second files.

13. The method according to claim 11, wherein the method further comprises applying a serialization protocol on the relational data to store serialized data in the first files and the second files while converting the relational data into the first file and the plurality of second files.

14. The method according to claim 13, wherein the method further comprises applying a compression protocol on the serialized data while converting the relational data into the first file and the second files.

15. The method according to claim 11, wherein the method further comprises storing a mapping of the relational data to the corresponding first file and the plurality of second files.

16. The method according to claim 11, wherein the method further comprises converting the relational data to the first file and the plurality of second files periodically at pre-determined time intervals.

17. The method according to claim 11, wherein the method further comprises converting the relational data to the first file and the plurality of second files in response to changes of the relational data.

18. The method according to claim 11, wherein the first files and/or the second files comprise at least one third key, wherein the key-value database further stores third files, wherein the method further comprises converting a part of the relational data to at least one third file, wherein the third files are accessible by using the at least one third key.

19. The method according to claim 11, wherein the purchases of products are bookings of travel-related products.

20. The method according to claim 19, wherein the method further comprises:
- based on a time dependency of a rate of a travel-related product, determining validity intervals of at least one price of the travel-related product;
- identifying within the validity intervals a periodicity and a structure of the at least one price;
- creating an identifier for the structure; and
- storing the validity intervals with respective identifiers separately from the structure.

21. A non-transitory machine-readable medium storing program code, wherein the program code is arranged to carry out a method for handling purchases of products, when executed on a computer system, the method including:
- accessing a relational database storing relational data for a plurality of products;
- accessing a key-value database storing a plurality of first files and a plurality of second files, wherein the first and second files represent the relational data, wherein the first files are accessible by using respective first keys associated with the products and comprise respective at least one second keys, wherein the second files are accessible by using the respective at least one second keys;
- converting, per product, at least a part of the relational data stored in the relational database into (i) one of the first files containing a plurality of the second keys and (ii) a plurality of the second files corresponding to the second keys contained in the first file;
- storing the one first file and the plurality of the second files in the key-value database;
- receiving an availability request for a product from a client device;
- querying the key-value database by using a first key associated with the product to retrieve a first file associated with the product;
- processing said first file to extract the plurality of the second keys and metadata associated with the plurality of second keys;
- comparing, per second key, among the plurality of second keys contained in the first file, the metadata with the availability request to determine a subset of the plurality of second keys contained in the first file for which the metadata fulfills the availability request;

querying the key-value database by using a list of the subset of the said second keys fulfilling the availability request to receive corresponding second files;

extracting data from said second files; and sending the data extracted from said second files to the client device.

22. The non-transitory machine-readable medium according to claim 21, wherein the method further comprises flattening a tree-like structure of the relational database while converting the relational data into the first file and the plurality of second files.

23. The non-transitory machine-readable medium according to claim 21, wherein the method further comprises applying a serialization protocol on the relational data to store serialized data in the first files and the second files while converting the relational data into the first file and the plurality of second files.

24. The non-transitory machine-readable medium according to claim 23, wherein the method further comprises applying a compression protocol on the serialized data while converting the relational data into the first file and the second files.

25. The non-transitory machine-readable medium according to claim 21, wherein the method further comprises storing a mapping of the relational data to the corresponding first file and the plurality of second files.

26. The non-transitory machine-readable medium according to claim 21, wherein the method further comprises converting the relational data to the first file and the plurality of second files periodically at pre-determined time intervals.

27. The non-transitory machine-readable medium according to claim 21, wherein the method further comprises converting the relational data to the first file and the plurality of second files in response to changes of the relational data.

28. The non-transitory machine-readable medium according to claim 21, wherein the first files and/or the second files comprise at least one third key, wherein the key-value database further stores third files, wherein the method further comprises converting a part of the relational data to at least one third file, wherein the third files are accessible by using the at least one third key.

29. The non-transitory machine-readable medium according to claim 21, wherein the purchases of products are bookings of travel-related products.

30. The non-transitory machine-readable medium according to claim 29, wherein the method further comprises:

based on a time dependency of a rate of a travel-related product, determining validity intervals of at least one price of the travel-related product;

identifying within the validity intervals a periodicity and a structure of the at least one price;

creating an identifier for the structure; and storing the validity intervals with respective identifiers separately from the structure.

\* \* \* \* \*